(12) United States Patent
Wagner et al.

(10) Patent No.: US 8,525,881 B2
(45) Date of Patent: Sep. 3, 2013

(54) IMAGING SYSTEM FOR A VEHICLE AND MIRROR ASSEMBLY COMPRISING AN IMAGING SYSTEM

(75) Inventors: Daniel Wagner, Weinstadt (DE); Frank Linsenmaier, Weinstadt (DE)

(73) Assignee: SMR Patents S.a.r.l., Luxembourg (LU)

( * ) Notice: Subject to any disclaimer, the term of this patent is extended or adjusted under 35 U.S.C. 154(b) by 499 days.

(21) Appl. No.: 12/465,998

(22) Filed: May 14, 2009

(65) Prior Publication Data

US 2009/0284599 A1 Nov. 19, 2009

(30) Foreign Application Priority Data

May 16, 2008 (EP) .................................... 08009049

(51) Int. Cl.
*H04N 7/18* (2006.01)
(52) U.S. Cl.
USPC .......................................... 348/148; 348/118
(58) Field of Classification Search
USPC ................................................... 348/148, 118
See application file for complete search history.

(56) References Cited

U.S. PATENT DOCUMENTS

| | | | | |
|---|---|---|---|---|
| 5,629,517 A * | 5/1997 | Jackson et al. | ............ | 250/208.1 |
| 6,483,438 B2 * | 11/2002 | DeLine et al. | ............ | 340/815.4 |
| 7,342,484 B2 * | 3/2008 | Lang et al. | ............... | 340/426.26 |
| 7,365,303 B2 * | 4/2008 | Pallaro | ........................... | 250/221 |
| 2003/0122930 A1 * | 7/2003 | Schofield et al. | ............. | 348/148 |
| 2003/0123705 A1 | 7/2003 | Stam et al. | | |
| 2005/0035208 A1 * | 2/2005 | Elliot et al. | .............. | 235/472.01 |
| 2005/0154503 A1 * | 7/2005 | Jacobs | .............................. | 701/1 |
| 2005/0200700 A1 * | 9/2005 | Schofield et al. | ............. | 348/148 |
| 2006/0276985 A1 * | 12/2006 | Xu et al. | ......................... | 702/81 |
| 2007/0012865 A1 * | 1/2007 | Katzir et al. | ............... | 250/208.1 |
| 2007/0023611 A1 | 2/2007 | Saccagno | | |
| 2007/0297075 A1 * | 12/2007 | Schofield et al. | ............. | 359/872 |
| 2008/0174453 A1 * | 7/2008 | Schofield | ..................... | 340/933 |
| 2008/0219505 A1 * | 9/2008 | Morimitsu | .................. | 382/103 |
| 2009/0185167 A1 * | 7/2009 | Gouch | ............................. | 356/73 |
| 2010/0271480 A1 * | 10/2010 | Bezborodko | ................. | 348/148 |

FOREIGN PATENT DOCUMENTS

EP 1777943 A1 * 4/2007

* cited by examiner

*Primary Examiner* — Firmin Backer
*Assistant Examiner* — Jonathan Bui
(74) *Attorney, Agent, or Firm* — Reising Ethington PC (57) ABSTRACT

The invention relates to an imaging system comprising at least two sensors surveying one or more fields of vision, at least one imaging sensor chip comprising an array of light-sensitive elements, wherein image information provided by the at least two sensors are projected on the at least one imaging sensor chip. The imaging sensor chip provides dedicated sensor areas, wherein each dedicated sensor area is assigned to one dedicated sensor.

4 Claims, 7 Drawing Sheets

IMAGING SYSTEM FOR A VEHICLE AND MIRROR ASSEMBLY COMPRISING AN IMAGING SYSTEM

The invention is based on a priority patent application EP 08009049.1 which is hereby incorporated by reference.

FIELD OF THE INVENTION

The invention pertains to an imaging system for a vehicle and a mirror assembly comprising an imaging system comprising at least two sensors surveying one or more fields of vision, at least one imaging sensor chip comprising an array of light-sensitive elements, wherein image information provided by the at least two sensors are projected on the at least one imaging sensor chip, wherein the imaging sensor chip provides dedicated sensor areas, wherein each dedicated sensor area is assigned to one dedicated sensor of a sensor unit, characterized in that the sensor unit is arranged in a head of the mirror assembly.

BACKGROUND OF THE INVENTION

Modern vehicles are equipped with multiple sensors in order to support the driver and to increase the active and passive safety of the vehicle. For instance, headlamps can be controlled to generate either low beams or high beams. Low beams provide less illumination and are used to illuminate the forward path when other vehicles are present ahead of the ego vehicle. High beams provide more illumination and are used to illuminate the forward path when no other vehicles are present ahead of the ego vehicle.

Another operational area for sensors are driver assistant systems which survey the surroundings of the ego vehicle e.g. for detecting obstacles when a lane change is intended or when the ego vehicle is maneuvered into a parking position.

More and more optical functions have to be integrated into the vehicle, provided by a multitude of sensors or sensor systems which are distributed all over the vehicle. The different views of the various sensor systems allow for increasing the level of safety. An imaging system for vehicle lights is disclosed in US-A-2003/0123705.

It is known in the art to employ imaging sensor chips like CCD arrays (CCD=charged coupled device) or CMOS arrays (CMOS=complementary metal oxide semiconductor). It is known to project an image onto a single imaging sensor chip and detect different images by using color filters.

EP 1 777 943 A discloses an imaging system comprising a multitude of sensors surveying one or more fields of vision and an imaging sensor chip comprising an array of light-sensitive elements. Image information provided by the sensors are projected on the imaging sensor chip. The imaging sensor chip provides dedicated sensor areas, wherein each dedicated sensor area is assigned to one dedicated sensor.

SUMMARY OF THE INVENTION

It is an object of the invention to provide a mirror assembly comprising a compact and reliable imaging system for a vehicle. Another object is to provide a turn indicator module comprising a mirror assembly comprising an imaging system.

The objects are achieved by the features of the independent claims. The other claims and the description disclose advantageous embodiments of the invention.

According to a first aspect of the invention, a mirror assembly comprising an imaging system is proposed which comprise at least two sensors surveying one or more fields of vision, at least one imaging sensor chip comprising an array of light-sensitive elements, wherein image information provided by the at least two sensors are projected on the at least one imaging sensor chip. The imaging sensor chip provides dedicated sensor areas, wherein each dedicated sensor area is assigned to one dedicated sensor. The optical information captured by different sensors can be combined and analyzed by using one single imaging chip array. The optical information can be forwarded by a bulk optic arrangement and/or an optical light guide arrangement. The optical paths can be arranged perpendicular or arranged in a defined angle to each other. The imaging sensor chip can be arranged in a distance to the lenses at the optical entry of the sensors. Particularly, one or more imaging systems can be integrated into a vehicle mirror such as an external rear view mirror (side mirror), an internal rear view mirror and/or arranged at other appropriate locations particularly in a vehicle which are convenient for providing a reasonable survey of one or more desired fields of view.

The sensor unit is arranged in a head of the mirror assembly. Additionally, the sensor unit can be arranged in a base of the mirror assembly.

Particularly, specific pixels of an imaging chip array are assigned to a specific sensor. The image information can be projected and analyzed simultaneously.

The dedicated areas can be completely separated from one another. It is possible, however, to allow for an overlap of the areas to a certain amount. In this case, the image information projected onto the chip array can be clocked and consequently projected and analyzed with a time delay to each other.

By using only one single imaging sensor chip a compact and economically priced imaging system can be provided.

Each dedicated sensor can comprise a dedicated optical path assigned to the dedicated area of the sensor chip. The optical path can comprise at least one optical light guide and/or at least one mirror. A multitude of different fields of vision captured by adequate optical sensors can be focused to the sensor chip.

Favorably, the imaging system can comprise at least one of a lane change control sensor, one bird view sensor, one blind spot detection sensor and/or one collision warning sensor. In particular it is possible to combine a lane change control with a bird view or a blind spot detection with a collision warning sensor.

Preferably, the imaging system can comprise a control unit for analyzing the image information projected on each dedicated sensor area and for generating a control and/or alarm signal characteristic for the dedicated sensor corresponding to the image information projected on the dedicated sensor area.

According to a preferred embodiment, the sensor unit can be arranged in a turn indicator module, particularly a turn indicator of a rear view mirror assembly. Preferably, the optical light guide can be used as a light guide for the turn indicator module and for the sensor unit. This arrangement provides a very compact arrangement in a rear view mirror. Particularly in external rear view mirrors, the available construction space inside the mirror housing is very restricted. Thus, the invention is very useful for a vehicle, particularly a multifunctional mirror for vehicles, preferably a multifunctional vehicular rear view mirror.

BRIEF DESCRIPTION OF THE DRAWINGS

The present invention together with the above-mentioned and other objects and advantages may best be understood from the following detailed description of the embodiments, but not restricted to the embodiments, wherein is shown schematically.

DETAILED DESCRIPTION OF THE DRAWINGS

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

Figure 1:
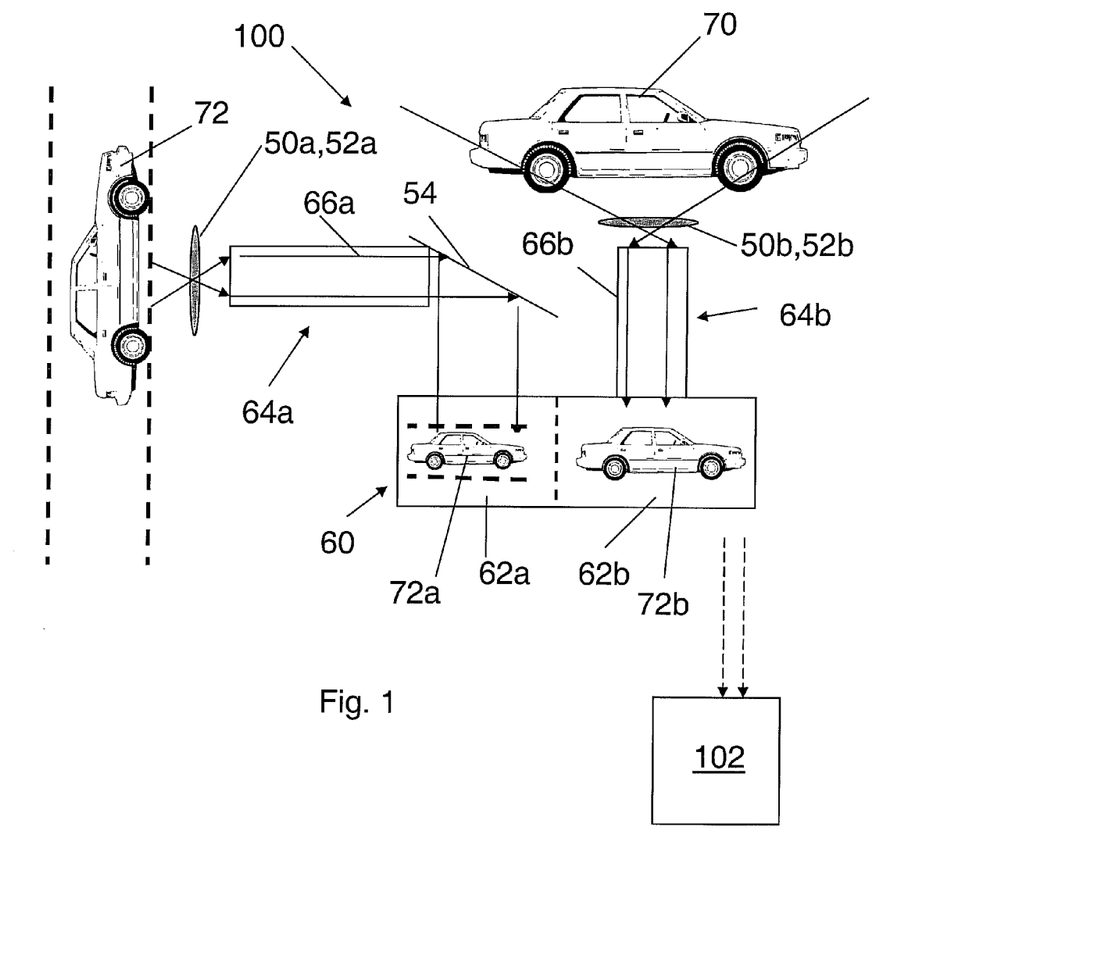
FIG. 1 a schematic diagram of first embodiment of an imaging system with a projection of multiple images on a single sensor chip.

FIG. 1 is a schematic diagram of first embodiment of an imaging system 100 of a preferred vehicle 10. Particularly, one or more imaging systems 100 can be integrated into a vehicle mirror such as an external rear view mirror (side mirror), an internal rear view mirror and/or other appropriate locations particularly in a vehicle which are convenient for providing a reasonable survey of one or more desired fields of view.

A single imaging sensor chip 60 is subdivided in a first area 62a and a second area 62b onto each of which an image information 72a and 72b is projected. The chip area consists of a multitude of regularly arranged photo sensor elements, also called pixels. A pixel is thought of as the smallest single component of a photo sensor chip; here a pixel represents a single photo sensor element. The areas 62a, 62b can be a two dimensional or a one dimensional array of pixels.

The image information 72a is collected by a first sensor 50a indicated by a first lens 52a and the image information 72b is collected by a second sensor 50b indicated by a second lens 52b.

An image caught by the first sensor 50a, e.g. a vehicle 72 driving on a lane adjacent to the ego vehicle equipped with the imaging system 100, is guided through an optical path 64a, for instance along an optical light guide 66a, and reflected by a mirror 54 towards the dedicated area 62a of the imaging sensor chip 60 which is assigned to the first sensor 50a and which displays the image information 72a. Adjacent to the dedicated area 62a the imaging sensor chip 60 provides another dedicated are 62b onto which the image information 72b of the second sensor 50b, e.g. a vehicle 70 in front of the ego vehicle, is projected through an optical path 64b, e.g. along an optical light guide 66b, onto the second area 62b of the imaging sensor chip 60. The two objects 70, 72 the images of which are projected on the dedicated areas 62a, 62b of the imaging sensor chip 60 are objects in two different fields of vision surveyed by the sensors 50a and 50b. In this example the fields of vision of the two sensors 50a, 50b are oriented perpendicular to each other.

The image information 72a, 72b is analyzed and processed in a control unit 102, which is coupled to e.g. a driver assistance system. The image information 72a, 72b can be displayed to the driver and/or analyzed in conventional ways for use in the driver assistance system, e.g. for issuing a collision warning, a lane change warning and the like. The image sensor control can be done as known in the art, e.g. as disclosed e.g. in US-A-2003/0123705.

Figure 2:
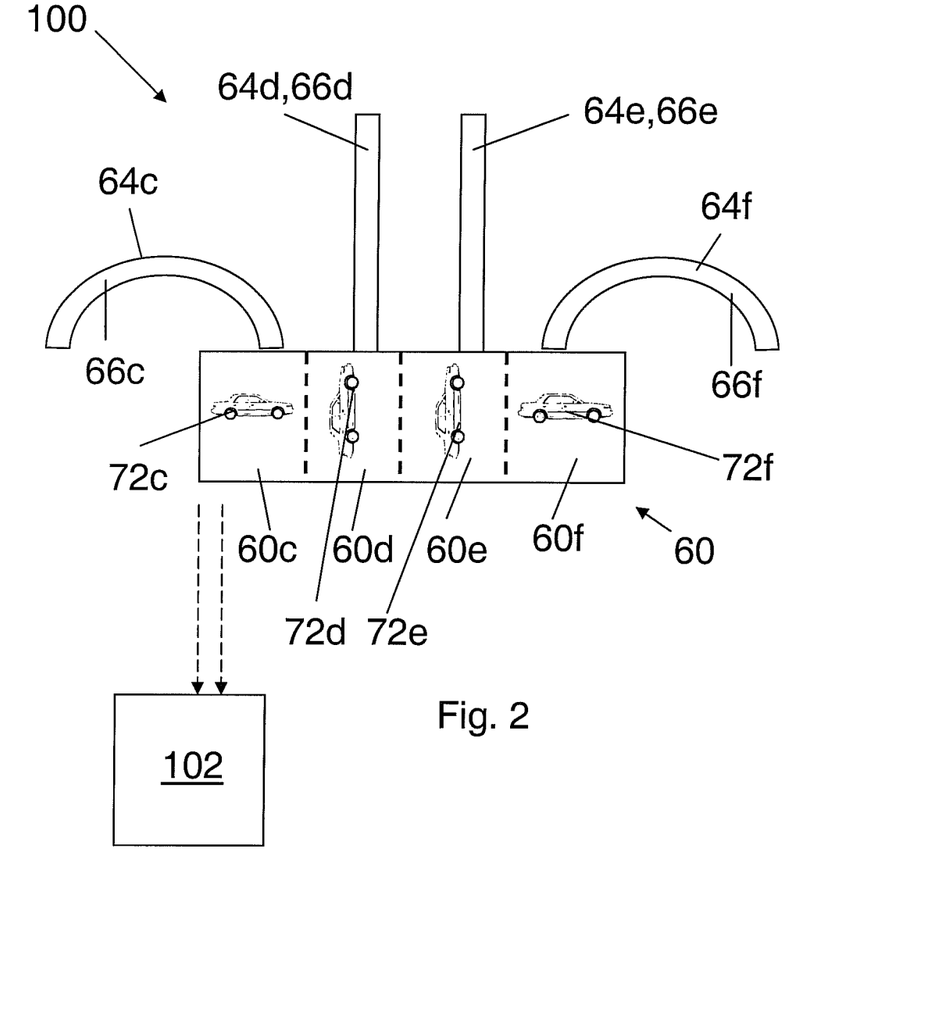
FIG. 2 a schematic diagram of second embodiment of an imaging system with a projection of multiple images on a single sensor chip.

FIG. 2 depicts an example embodiment wherein the imaging sensor chip 60 provides four dedicated areas 62c, 62d, 62e, 62f which receive image information 72c, 72d, 72e, 72f collected by respective sensors (not shown) through optical paths 64c, 64d, 64e, 64f consisting by way of example of optical light guides 66c, 66d, 66e, 66f. The image information 72c and 72f is collected from sensors oriented to a rearward region of the ego vehicle (not shown) and the image information 62d, 62e originates from sensors oriented forward region of the ego vehicle (not shown). The image information 72c, 72d, 72e, 72f can be used and/or analyzed as described above.

Figure 6:
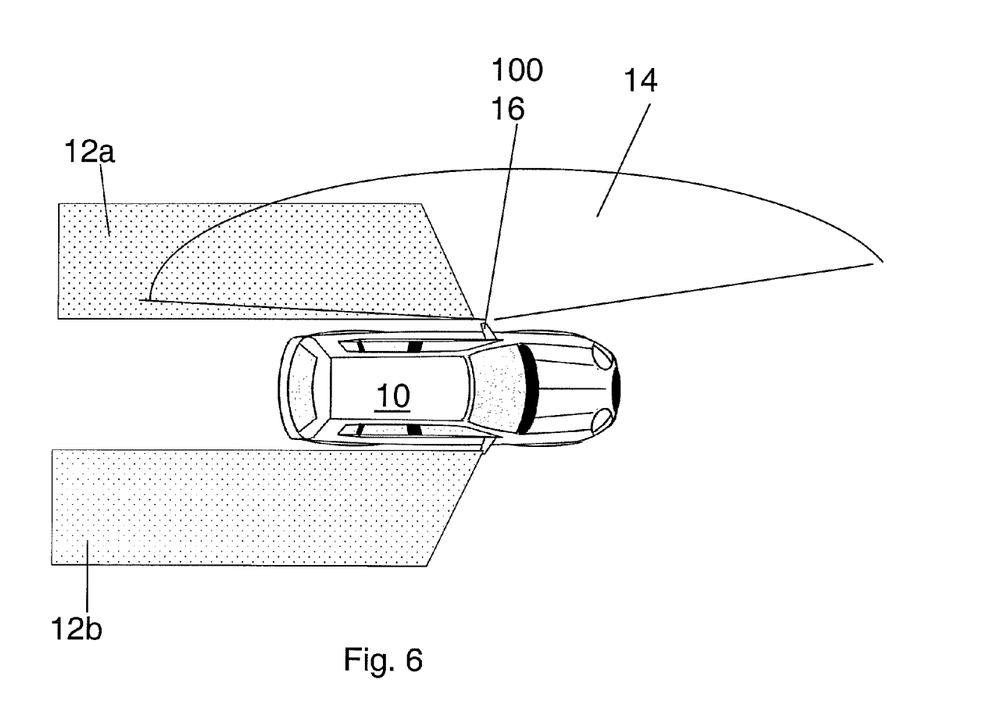
FIG. 6 a top view on a preferred vehicle with different fields of view surveyed by multiple sensors in the vehicle.

Examples for different fields of view 12a, 12b and 14 of sensor units 50 arranged in the left and right exterior rear view mirror assemblies 16 of the ego vehicle 10 are depicted in FIG. 6. The right side rear view mirror assembly 16 surveys an area of field of vision 12b and the left side rear view mirror assembly 16 surveys an area of field of vision 12a as well as an area of field of vision 14. Whereas the field of visions 12a and 12b are oriented rearwards of the vehicle 10, the field of vision 14 surveys the side area of the vehicle 10 on the driver's side, which is e.g. the left side of the vehicle.

FIGS. 3a, 3b, 4a, 4b, 5a, 5b depict preferred example embodiments of external rear vision mirror assemblies 16, each equipped with an imaging system 100 which is integrated in the exterior rear view mirror assembly 16.

The mirror assembly 16 is attached to the right or left side of a body of a vehicle 10. A mirror 20 closes an opening of a mirror housing 18. The mirror 20 is enframed by an inner vertical carrier 24 proximal to the body of the vehicle 10, an outer vertical carrier 26 distal to the body of the vehicle 10, a lower horizontal carrier 28 and an upper horizontal carrier 30. Inside the mirror housing 18 means for tilting the mirror 20 as well as heater units and the like can be arranged.

Figure 3A:
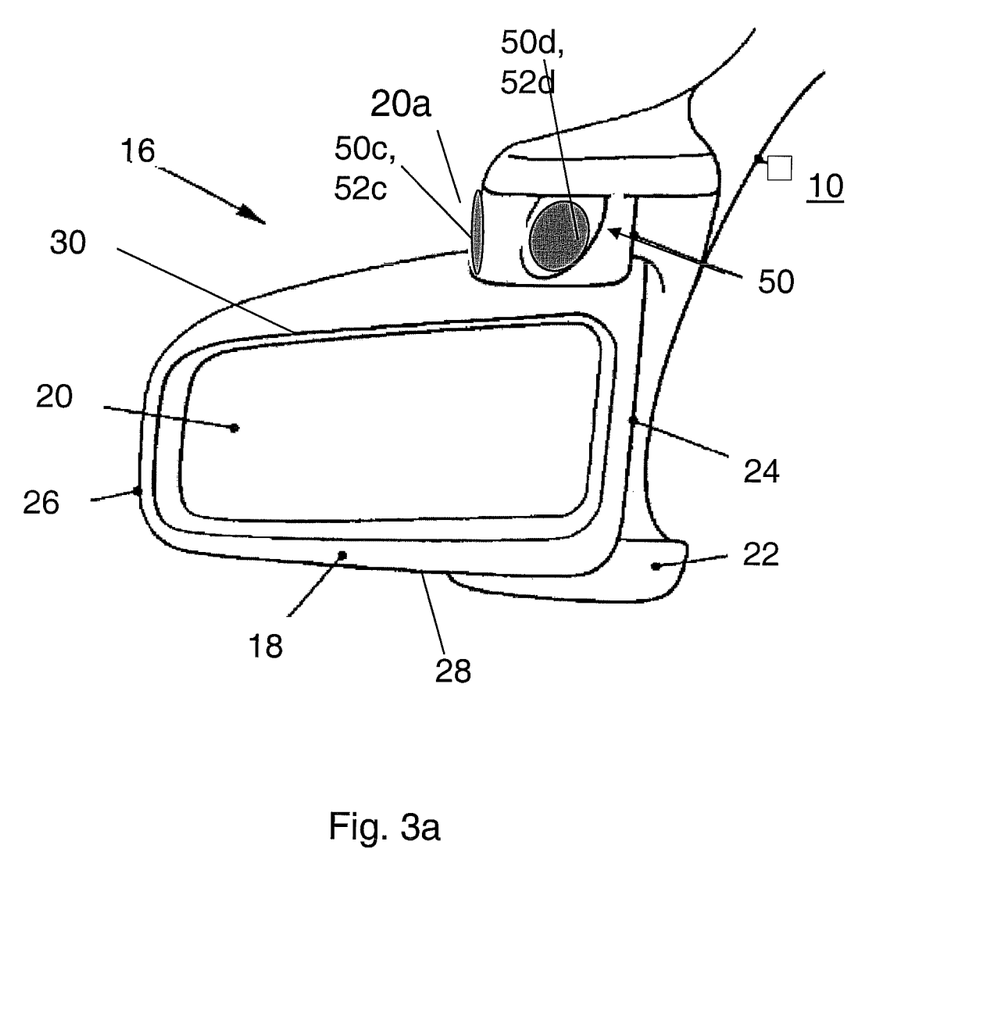
FIGS. 3a, 3b embodiments of a preferred rear view mirror showing a sensor unit arranged in the head of a mirror assembly (FIG. 3a) and in the base of a mirror assembly (FIG. 3b)
Figure 3B:
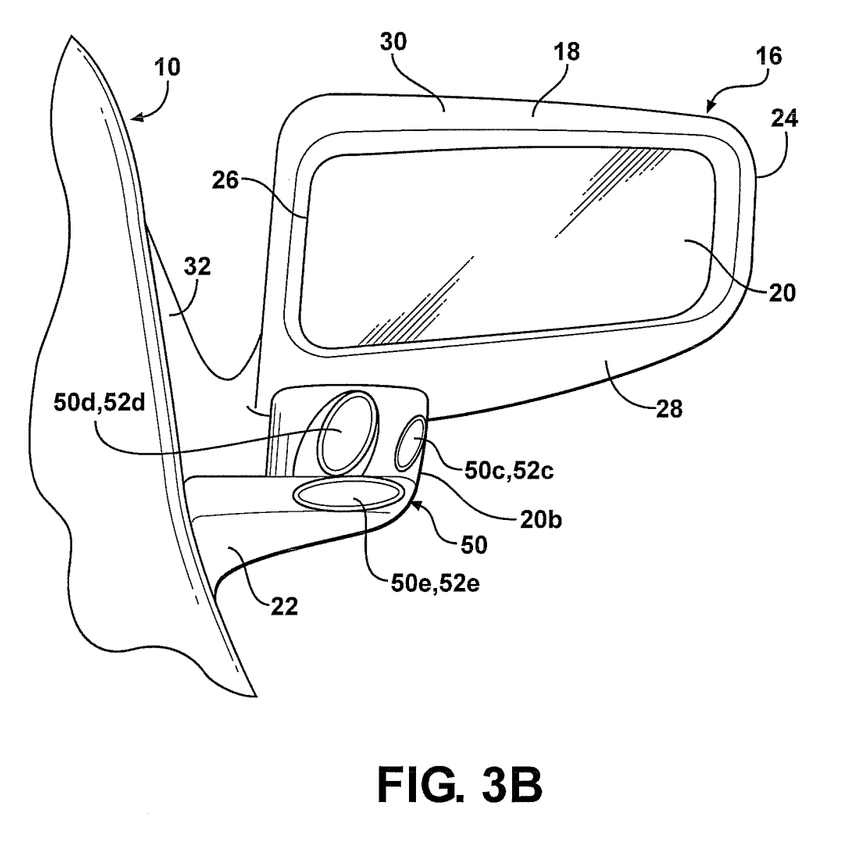

In FIGS. 3a and 3b example embodiments are depicted wherein a preferred sensor unit 50 of an imaging system 100 is arranged in the assembly 16 of an exterior rear view mirror.

The mirror housing 18 is attached to the vehicle body by a foldable portion 22 of the assembly 16 (FIG. 3a). The mirror housing 18 can be pivoted to and fro the body of the vehicle 10. The sensor unit 50 comprises a sensor 50c indicated by a lens 52c and a sensor 50d indicated by a lens 52d, which are arranged in an upper portion 20a of the assembly 16 on the top of the mirror housing 18 close to the pivotal axis (not shown) of the foldable portion 22. Sensor 50c can be for instance a lane change sensor, detecting objects which are present beside the vehicle 10, and sensor 50d can be e.g. a blind spot detection sensor, detecting objects which are present in an area behind the vehicle 10 which is not accessible by the driver.

FIG. 3b depicts an alternative arrangement wherein a lower portion 20b of the assembly 16 below the mirror housing 18 is supported by a mirror bracket 32. The sensor unit 50 is arranged below the mirror housing 18 between the lower horizontal carrier 28 and the pivotal portion of the assembly 16. Additionally, the mirror assembly 16 is arranged on the right side of the vehicle 10.

Additionally to the sensors 50c, 50d, which have been already described in FIG. 3a, a third sensor 50e indicated by a lens 52e is arranged below the sensors 50c, 50d. The field of view of the sensor 50e is e.g. directed downwards surveying the ambient of the vehicle 10.

Figure 4A:
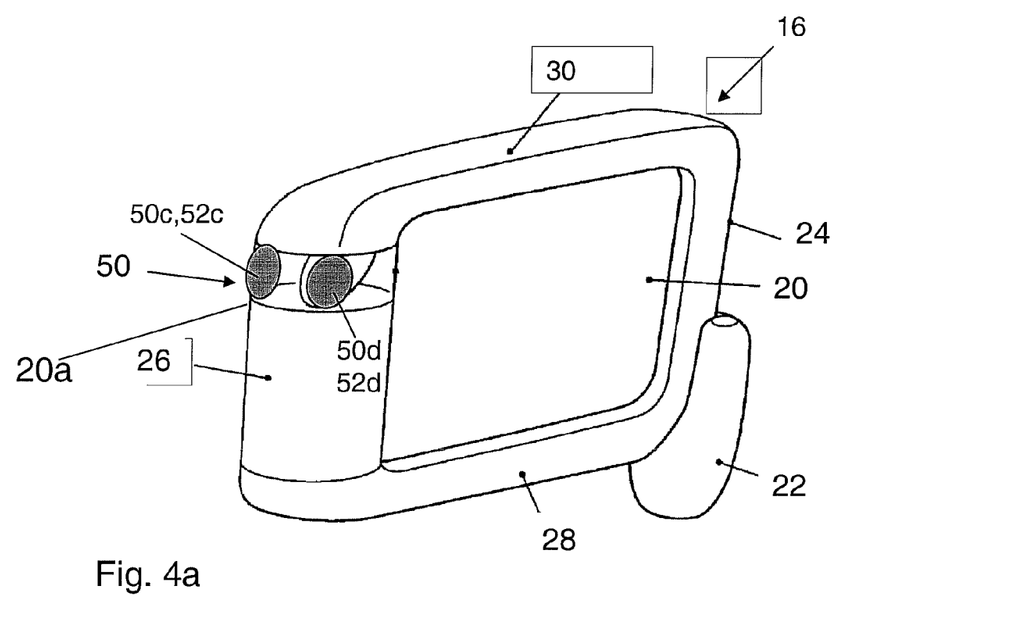
FIGS. 4a, 4b embodiments of a preferred rear view mirror exhibiting a sensor unit integrated in an upper part (FIG. 4a) and in a lower part (FIG. 4b) of a mirror housing.
Figure 4B:
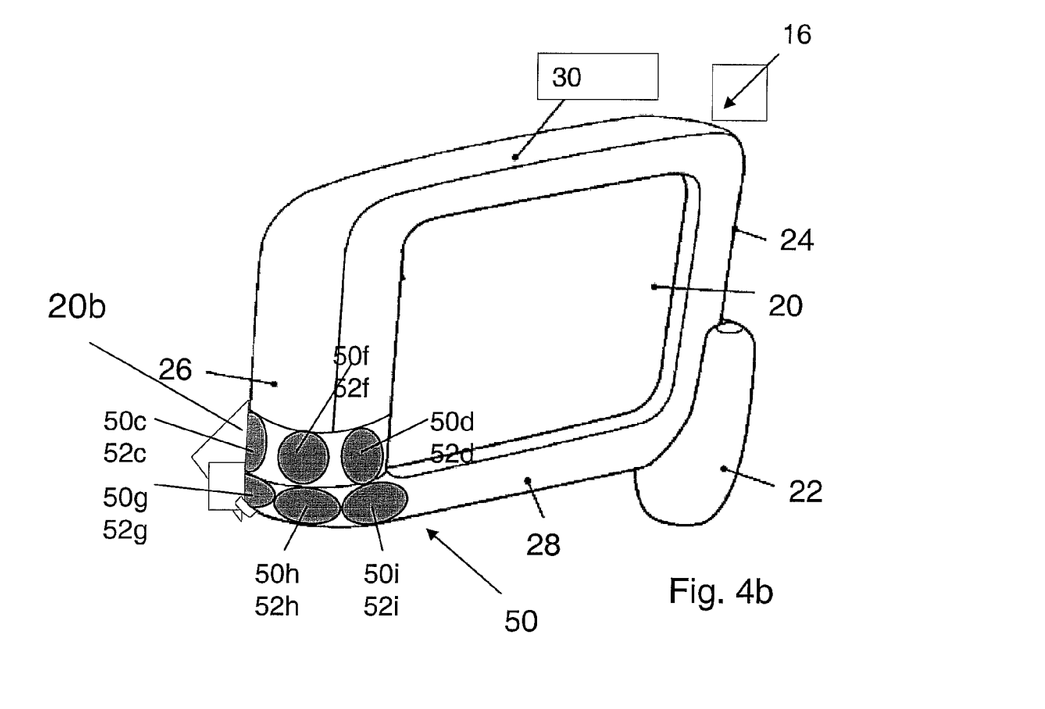

FIGS. 4a and 4b depict example embodiments wherein the sensor unit 50 is integrated into the mirror housing 18, particularly into the distal vertical carrier 26.

In the example embodiment displayed in FIG. 4a the sensor unit 50 is arranged in an upper portion 20a of the mirror assembly 16 and integrated into a distal vertical carrier 26 of the mirror housing 18. The mirror housing 18 is attached e.g. to the left side of the body of the vehicle 10 supported by a foldable portion 22. The foldable portion 22 allows to retracting the mirror housing 18 e.g. when the vehicle 10 is in a parking position. The sensor unit 50 is equipped with two sensors 50c and 50d, indicated by lenses 52c and 52d, which look to the free side and to the rear of the vehicle 10.

In the example embodiment displayed in FIG. 4b the sensor unit 50 is arranged in an lower portion 20b of the mirror assembly 16 and integrated into the distal vertical carrier 26 of a mirror housing 18. The mirror housing 18 is attached e.g. to the left side of the body of the vehicle 10 supported by a foldable portion 22. The foldable portion 22 allows to retracting the mirror housing 18 e.g. when the vehicle 10 is in a parking position. The sensor unit 50 comprises a multitude of sensors 50c, 50d, 50f in a first height and 50g, 50h, 50i arranged in a second height below the first height, indicated by lenses 52c, 52d, 52f and 52g, 52h, 52i, which look to the free side and to the rear of the vehicle 10. Such an arrangement can e.g. allow for a stereo view surveying objects in the respective fields of view.

Figure 5A:
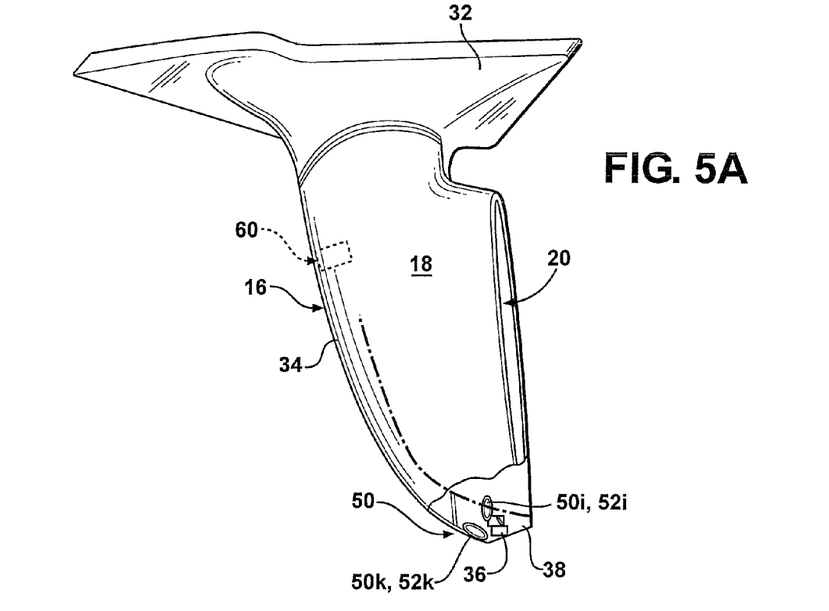
FIGS. 5a, 5b embodiments of a preferred rear view mirror with a sensor unit integrated in a turn indicator assembly with the sensor unit located at an distal part (FIG. 5a) and at a proximate part (FIG. 5b) of the turn indicator assembly.
Figure 5B:
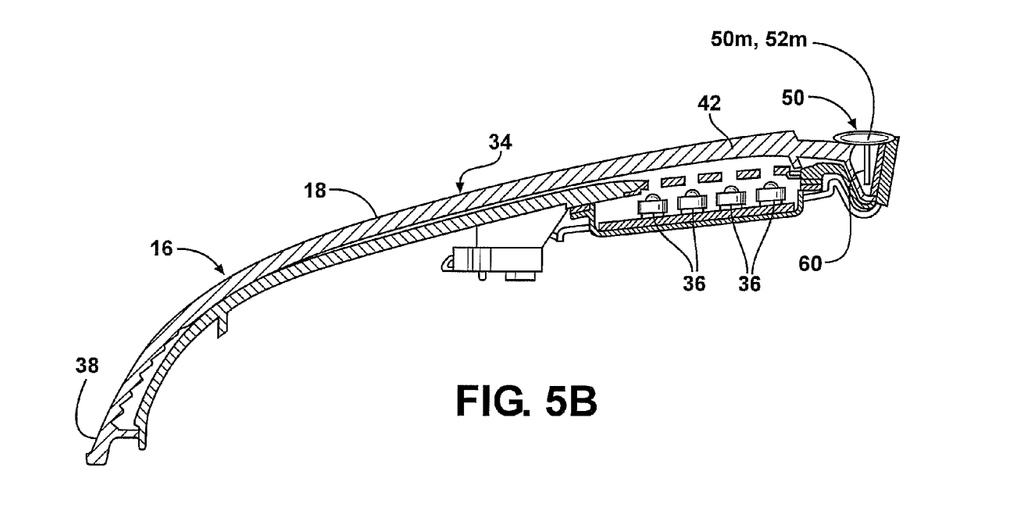

Referring now to FIGS. 5a and 5b two example embodiments are displayed, wherein the sensor unit 50 is integrated in a preferred turn indicator module 34 integrated in a mirror housing 18 of an exterior rear view mirror assembly 16. The preferred turn indicator module 34 comprises e.g. one or more light sources, such as one or more LEDs 36 (LED=light emitting diode), inside in the mirror housing 18. Light emitted by the LEDs 36 is transported along a light guide 42 from the location of the LEDs 36 towards a respective free end 38 of the mirror assembly 16 or the light guide 42 via internal total reflection within the light guide 42 as know in the art of light guide materials. As is known for light indicators 34 of this kind, the light can also exit the light guide 42 at other locations of the light guide surface. The mirror assembly 16 is attached e.g. by a bracket 32 to the body of the vehicle 10.

FIG. 5a presents a top view of a rear view mirror assembly 16 partially cut open at its free end 38, comprising a sensor unit 50. The sensor unit 50 provides two sensors 50k, 50l with lenses 52k and 52l at the free end 38 of the mirror assembly 16 and the light guide 42 of the turn indicator module 34. An LED 36 is arranged at the free end 38, one or more additional light sources can be arranged inside the mirror housing 18. An imaging sensor chip 60 of the sensor unit 50 can be arranged close to or at a distance of the sensors 50k, 50l, preferably at the opposite side of the light guide 42, thus making use of its light guide properties to transport image information from the sensors 52k, 52l to the sensor chip 60. A respective control unit (not shown) can be located in the mirror assembly 16 or inside the vehicle 10.

FIG. 5b depicts a longitudinal sectional view through a light guide 42 of a rear view mirror assembly 16 which is a part of a turn indicator module 34. A multitude of LEDs 36 is located at one end of the mirror housing 18 proximate to the vehicle body. Juxtaposed to the LEDs 36 the sensor unit 50 is arranged with a sensor 50m comprising a lens 52m. The imaging sensor chip 60 can be placed close to the lens 52m.

It is possible to combine an arrangement as depicted in FIG. 5a exhibiting one or more sensors 50k, 50l at the distal end of the light guide 42 with an arrangement as depicted in FIG. 5b with one or more sensors 50m at the proximate end of the light guide 42. The turn indicator module 34 can be a separate assembly with an integrated imaging system 100.

The invention claimed is:

1. An exterior rearview mirror assembly comprising a mirror head and an imaging system, wherein said imaging system includes at least two sensors surveying one or more fields of vision, a single imaging sensor chip having an array of light-sensitive elements, wherein image information provided by the at least two sensors are projected on the single imaging sensor chip, wherein the single imaging sensor chip provides dedicated sensor areas, wherein each of the dedicated sensor areas is assigned to one of the at least two sensors, wherein each of the at least two sensors includes a dedicated optical path assigned to each of the dedicated sensor areas of the sensor chip and are arranged in the mirror head such that each of the dedicated sensor areas overlap each other by an amount greater than zero, whereby image information projected on the array of light-sensitive elements is timed and subsequently projected and analyzed with a time delay to each other, such that a multitude of different fields of vision captured by the sensors is focused to the dedicated sensor areas of the sensor chip and are discernible even if the image information from the at least two sensors is projected onto portions of the dedicated sensor areas that overlap.

2. The system according to claim 1 wherein each of the dedicated optical paths includes at least one optical light guide and/or at least one mirror.

3. The system according to claim 1 including a control unit for analyzing the image information projected on each dedicated sensor area and generating a control and/or alarm signal characteristic for the dedicated sensor corresponding to the image information projected on the dedicated sensor area.

4. A turn indicator module for an exterior rearview mirror assembly comprising an imaging system including at least two sensors surveying one or more fields of vision, a single imaging sensor chip having an array of light-sensitive elements, wherein image information provided by the at least two sensors are projected on the single imaging sensor chip, wherein the imaging sensor chip provides dedicated sensor areas, wherein each of the dedicated sensor areas is assigned to one of the at least two sensors, wherein each of the at least two sensors includes a dedicated optical path assigned to each of the dedicated sensor areas of the sensor chip and are arranged in said turn indicator module of said exterior rearview mirror assembly such that each of the dedicated sensor areas overlap each other by an amount greater than zero, whereby image information projected on the array of light-sensitive elements is timed and subsequently projected and analyzed with a time delay to each other, such that a multitude of different fields of vision captured by the sensors is focused to the dedicated sensor areas of the sensor chip and are discernible even if the image information from the at least two sensors is projected onto portions of the dedicated sensor areas that overlap.

* * * * *